Jan. 2, 1940.          R. G. DANIEL          2,185,543
VULCANIZER ADAPTER
Filed May 3, 1937

INVENTOR.
*R. G. Daniel*
BY *Carlos G. Stratton*
ATTORNEY.

Patented Jan. 2, 1940

2,185,543

UNITED STATES PATENT OFFICE 2,185,543

VULCANIZER ADAPTER

Royal G. Daniel, Beverly Hills, Calif.

Application May 3, 1937, Serial No. 140,301

3 Claims. (Cl. 18—18)

My invention relates to vulcanizer adapters, and more particularly to an adapter that will conform to tires of various sizes, within predetermined limits.

An important object of my invention is to provide such an adapter that will not make a rib or ridge on the tire at the edge of the bead plate.

Another object is to provide shoulder plates and bead plate extensions that telescope the one with the other.

The invention also comprises novel details of construction and novel combinations and arrangements of parts, which will more fully appear in the course of the following description.

In the drawing, like reference characters designate similar parts in the several views.

Figure 1:
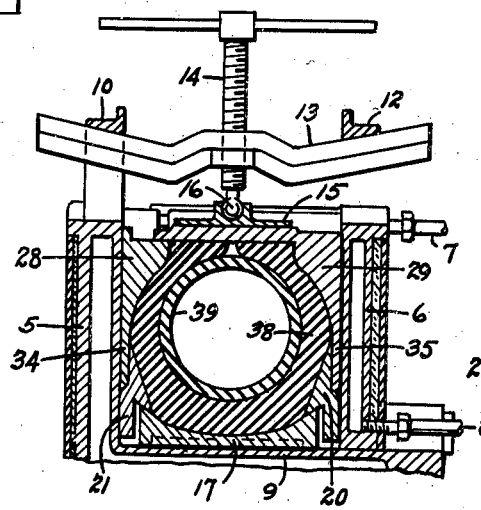
Figure 1 is a vertical section through a vulcanizer in which is shown a cross section of an embodiment of my invention.
Figure 2:
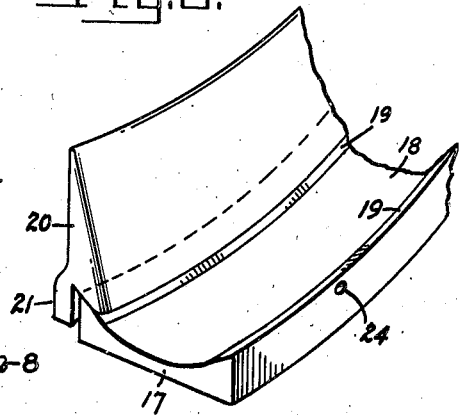
Figure 2 is a broken perspective of a part of said embodiment.
Figure 3:
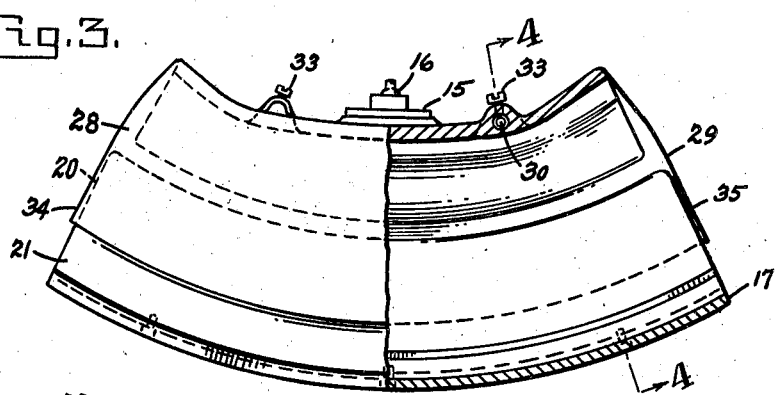
Figure 3 is a side elevation, partly in section, of said embodiment.
Figure 4:
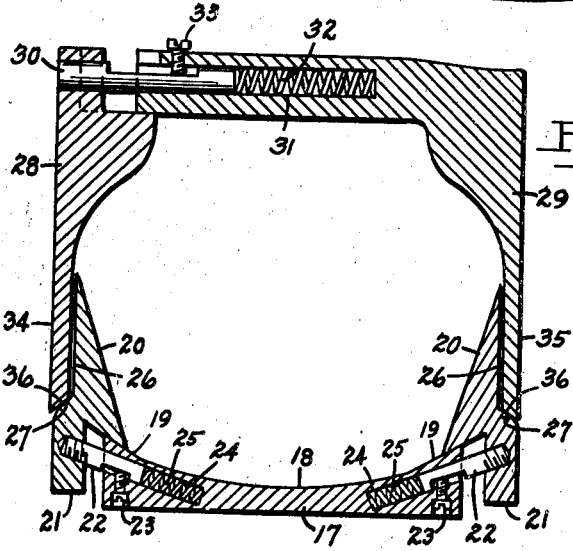
Figure 4 is an enlarged section taken on the line 4—4 of Figure 3.

Referring more in detail to the drawing, the reference number 5 generally designates a stationary wall of a tire vulcanizer, while a relatively movable wall is shown at 6. Conduits 7 and 8 conduct heated fluid to and from the movable wall. Means for heating the stationary wall and a base plate 9 of the vulcanizer are not shown. Hooks 10 and 12 on the stationary and movable walls provide engaging means for a cross bar 13. A clamp bolt 14 is adjustable in the cross bar. A clamping plate 15 has a ball and socket connection 16 with the foot of the bolt 14. Thus far is construction substantially as shown in my Patent No. 2,064,416, issued to me on December 15, 1936.

The present invention comprises a tread plate 17, having a curved portion 18 and flat edge portions 19. The curved portion 18 is a matrix for the tread of the tire and may be machined out, in any desired pattern. Shoulder plates 20 are slidable up and down the flat portions 19 at either side of the tread plate 17. The shoulder plates have depending flanges 21. Pins 22, screwed into the flanges 21, slide in alined recesses 24 in the tread plate 17, directing the movement of the shoulder plates 20.

Set screws 23 on the tread plate limit such movement, while coiled springs 25 in the recesses 24 urge the shoulder plates outwardly with regard to the tread plate 17. The shoulder plates 20 have offsets 27 providing shoulders 26 on their outer faces.

Bead plates 28 and 29 are provided normally above the shoulder plates. Pins 30 are fixed on the bead plate 28 as by a driving fit, and slide in alined recesses 31 in the bead plate 29. Coiled springs 32 in the recesses 31 urge the bead plates apart when under tension, and set screws 33 limit relative movement of the bead plates.

The bead plates 28 and 29 have depending flanges 34 and 35 respectively, which slide on the shoulders 26 of the shoulder plates. Abutting edges of the flanges 34, 35 and offsets 27 are inclined, as shown at 36.

In the use of my present invention, the tread plate 17 and shoulder plates 20 are inserted in any suitable vulcanizer or heater. The vulcanizer shown in Figure 1 is merely a suggestion. A tire 38 and its contained air bag 39 are then inserted in place on the tread plate 17. The bead plates are then placed on the beads of the tire, as shown in Figure 1, with the flanges 34, 35 depending at either side of the tire and disposed on the shoulders 26.

After the cross bar 13, the bolt 14 and the clamping plate 15 are positioned on the bead plates, the movable wall 6 is forced toward the stationary wall 5, compressing my shoulder and bead plates tightly against the sides of the tire. The air bag 39 is inflated and heat applied to the mold as usual. Due to the integral nature of the flanges 34, 35 and the bead plates 28, 29, no ridge or rib of rubber is formed on the tire at the junctions of the bead plates and said flanges.

Said compression of the adapter plates places tension in the springs 25 and 32, whereby the adapter bead plates and the adapter shoulder plates are moved apart when the movable wall 6 and clamping plate 15 are released, thereby releasing the tire after vulcanization.

It is believed apparent that the present adapters easily conform not only with tires of different widths, but also with tires of different depths. The flanges 34, 35 are free to slide up and down upon the shoulders 26, which affords the adjustment for tires of different depths.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A vulcanizer comprising opposed walls, a tread plate between the walls, a plate at either side of the tread plate, the latter plates having inner faces for engaging the shoulders of a tire placed in the vulcanizer and having offset outer faces, one portion of each of said offset outer faces engaging the opposed walls of the vulcanizer, bead plates arranged to engage the beads of a tire in said position, and integral flanges on the bead plates having sliding engagement with another portion of said offset outer faces, the outer faces of the flanges and the outer faces of said first-mentioned portion of the offset faces being substantially in alinement to present substantially flat faces to the walls of the vulcanizer.

2. Vulcanizer adapter means comprising a tread plate having inclined sliding surfaces, a shoulder plate slidable on each of said surfaces at either side of the tread plate, the shoulder plates having shoulders on outer faces with regard to a tire in the adapter means, bead plates arranged to engage the beads of a tire in said position, and flanges on the bead plates having sliding engagement with the outer faces of the shoulder plates and being limited in one direction by the shoulders on the latter plates, the shoulders being so arranged that when the flanges engage said shoulders the bead plates are lifted by the shoulder plates sliding up the inclines on the tread plate.

3. Vulcanizer adapter means comprising a tread plate, a shoulder plate slidable on the tread plate at either side thereof, the shoulder plates having inner faces for engaging the shoulders of a tire placed in the adapter means, flanges on the shoulder plates, pins on the flanges and the tread plate to direct the sliding movement of the shoulder plates relative to the tread plate, portions of the outer faces of the shoulder plates being offset with regard to the outer faces of the flanges, bead plates arranged to engage the beads of a tire in said position, and flanges on the bead plates having sliding engagement with the offset portion of the outer faces of the shoulder plates.

ROYAL G. DANIEL.